March 18, 1969   E. A. H. HONORE ET AL   3,434,143
APPARATUS FOR DETERMINING THE RADIOLOCATION OF A MOVABLE PART
Filed Feb. 28, 1967   Sheet 1 of 2
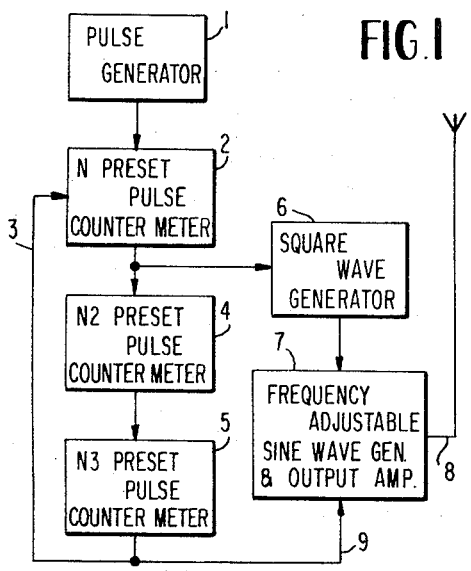
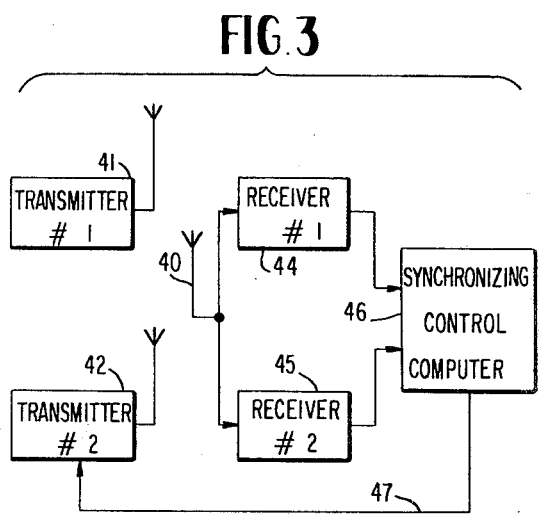
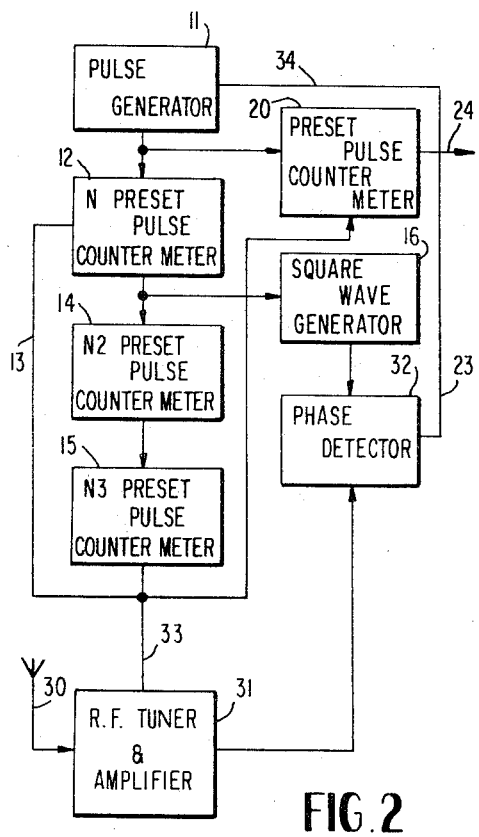
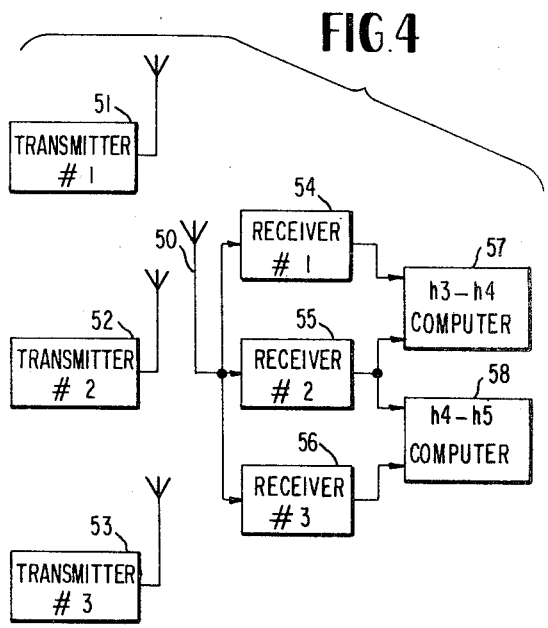
INVENTORS
ETIENNE A. H. HONORE
EMILE L. G. TORCHEUX
BY Craig & Antonelli
ATTORNEYS March 18, 1969 E. A. H. HONORE ET AL 3,434,143
APPARATUS FOR DETERMINING THE RADIOLOCATION OF A MOVABLE PART
Filed Feb. 28, 1967 Sheet 2 of 2
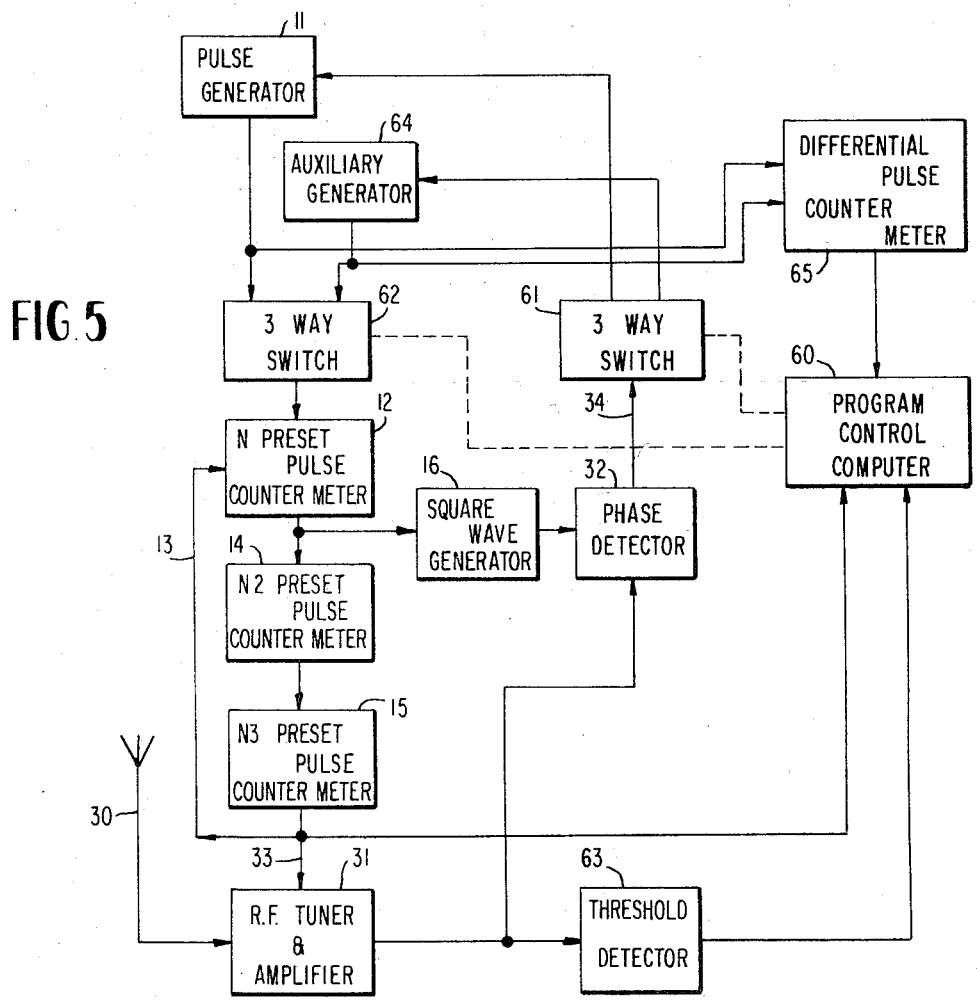
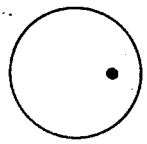 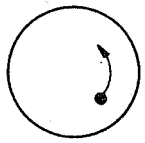 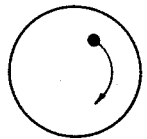
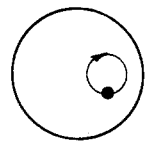 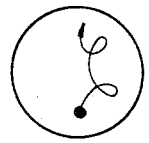
INVENTORS
ETIENNE A.H. HONORE
EMILE L.G. TORCHEUX
BY Craig & Antonelli
ATTORNEYS United States Patent Office 3,434,143
Patented Mar. 18, 1969

3,434,143
APPARATUS FOR DETERMINING THE RADIO-
LOCATION OF A MOVABLE PART
Etienne A. H. Honore, Chatenay-Malabry, Hauts-de-
Seine, and Emile L. G. Torcheux, Paris, France, as-
signors to Societe d'Etude et d'Application des
Techniques Nouvelles, Paris, France
Filed Feb. 28, 1967, Ser. No. 619,266
Claims priority, application France, Mar. 29, 1966,
55,325
U.S. Cl. 343—105          9 Claims
Int. Cl. G01s 1/30

ABSTRACT OF THE DISCLOSURE

Apparatus for determining the radiolocation of a movable part carrying a plurality of radio receiving subassemblies with reference to cooperating mutually spaced transmitting stations lying at predetermined geographical points. The frequency of the waves transmitted from each transmitting station to the corresponding receiving subassembly is caused to vary in discrete constant frequency steps with each step lasting a few seconds. The transition from one constant frequency step to the next, during a single transmission cycle of operation, is phase coherent in order to enhance the accuracy of the measurements of phase differences in the radio receiving subassemblies.

---

Our invention has for its object radio-locating methods and means of the type resorting to the measurement of differences in the duration of travel of a wave for ascertaining the location of a movable part, said waves being transmitted by stations located at a well-known geographical points. It is a well-known fact that the knowledge of the difference between the durations of travel of waves transmitted from two different points allows defining a locus constituted by a hyperbola on which the movable part is located. The measurement of another difference between the durations of travel of waves transmitted by two other stations, of which one may be the same as one of the preceding stations, supplies a further locus, the movable part being located at the crossing point between the two hyperbolas.

When it is desired to operate on very large areas extending even throughout the surface of the terrestrial globe, it is essential to resort to radio-electric waves of a very low frequency, said waves being the only ones adapted to progress throughout the surface of the earth. Their frequency ranges between 10 and 20 kilocycles, which corresponds to wavelengths ranging between 30 and 15 kilometers.

It is also a known fact that the data supplied by arrangements of the above type are subjected to an ambiguity due to the fact that the wavelength used is shorter than the distance separating the transmitting stations, said stations being for various reasons very far from one another, in principle by several thousand kilometers.

It has already been proposed to cut out said ambiguity by resorting to a number of series of measurements executed by means of waves having different frequencies.

Generally, said metrol is actually highly efficient but in the case of very long waves, it becomes sometimes inoperative by reason of an anomalic propogation due mainly to interferences between the ground waves and the sky waves.

Furthermore, experience has shown that when the receiving station lies in the vicinity of the antipode of the transmitting station, that is of the point where the straight line passing through the transmitting station and the center of the earth passes again out of the terrestrial surface, the interferences obtained between the waves following the shortest path between the transmitting station and the receiving station and the waves which have followed the path passing through the antipode are such that the conventional systems allow no longer obtaining reliable measurements.

Our invention has now for its object an improved radiolocating system which allows reducing the above-mentioned drawbacks and increasing furthermore the accuracy of the measurements. Our invention relates on a generalization of the concept of phase as will be disclosed now for a proper understanding of the invention.

When a sinusoidal wave of an unvarying frequency $f$ is transmitted, its instantaneous amplitude varies as a function of time $t$ according to the well-known law $$A \cos (2\pi ft + \varphi)$$

In said formula, $A$ is a constant and $\varphi$ the initial value of the phase. When the frequency $f$ varies with time, the above-mentioned value $\varphi$ of the phase is no longer of any great interest and it is preferably to consider the instantaneous amplitude of the sinusoidal wave transmitted, which amplitude is equal to $A \cos \theta$ with $$\theta = 2\pi \int_0^t f dt + \varphi$$

$\theta$ being an angle, it is immediately apparent that when $f$ is constant $\theta = 2\pi ft + \varphi$, which is the above-referred to conventional formula.

We will term hereinafter "total phase" of the sinusoidal wave transmitted the amount $\theta$ defined hereinabove, the value of which is equal to the sum of the phase $\varphi$ in the conventional meaning thereof and of the integral $$2\pi \times \int_0^t f dt$$

It is thus apparent that $\theta$, during a lapse of time which may be equal, for instance, to several thousand periods of the wave transmitted, increases continuously with time and its value may reach at the end of the lapse of time considered several thousand revolutions, each revolution corresponding to one period of the wave transmitted.

Now, according to our invention, the value of the frequency of the wave radiated by a transmitting station during an operating cycle is modified in accordance with a periodical accurately defined law or programme, the duration of each operating cycle being of a magnitude of several seconds.

Preferably, the value of the frequency varies always in the same direction and for instance it increases constantly in each operating cycle of the transmitting station.

Each period of operation of the transmitting station, hereinafter referred to as an operating cycle, is decomposed into a number of fractions or stages during each of which the frequency of the transmitted wave is substantially constant, and what is essential, the different waves thus transmitted in succession are phase coherent inasmuch as the value of the total phase $\theta$ as defined hereinabove of the wave transmitted during the cycle varies in a continuous manner and is not subjected to any sudden change or jump when the frequency passes from one value to the next. In other words, the total phase of the wave transmitted is not lost when the frequency passes from one frequency stage to the next. As will be disclosed hereinafter, said essential feature allows adjusting the parts at the receiving station with a view to cutting out the above referred to ambiguity.

Furthermore, the modification in the value of the frequency change between two successive stages is very small, which explains that a large number of stages is required during an operating cycle. Said further feature allows producing in practice an almost continuous scanning, from a frequency standpoint, of the properties of the media through which the waves are transmitted between the transmitting station and the receiving station. This is extremely important since it is a well-known fact that the characteristics of the propagation of wireless waves often depend in a critical manner on the value of the frequency, so that a sweep through a range of frequencies in a sufficiently thorough manner allows cutting out the anomalies which might appear if only one or a small number of unvarying predetermined frequencies were used.

According to a further feature of our invention, the waves to be transmitted are generated by resorting at the transmitter end to a very stable pulse generator, that is a generator wherein the frequency of repetition of the pulses is stabilized with a high accuracy of a magnitude of say $10^{-8}$. The pulses produced by said generator control a system of meters of which one supplies output pulses at predetermined moments of the cycle. For instance, during the first fraction of the cycle, that is for the first frequency stage, the meter considered supplies a pulse each time it has counted 500 pulses transmitted by said generator, and during the second fraction of the cycle corresponding to the second frequency of the cycle, each time it has counted 499 pulses and so on.

The pulses thus applied serve for generating a square signal of which consequently the frequency $f$ varies while however its front and rear edges are defined with a very high accuracy. Said square signals control the actual transmitting station in a manner such that the value of the frequency of the radiated wave is equal at any moment to the frequency $f$ of said signals, which frequency varies with time. Consequently, the radiated wave actually shows the desired characteristic data; on the one hand, its frequency $f$ varies during the cycle very accurately in accordance wtih a predetermined programme and, on the other hand, its total phase is a function which increases in a continuous manner when the frequency passes from one stage to the next.

It will be remarked that through its actual structure, our improved transmitter supplies a discrete sequence of frequencies ranging for instance between 10 and 14 kilocycles, the value of each of said different discrete frequencies being defined with a very high accuracy of a magnitude of $10^{-7}$, which accuracy is incomparably higher than that obtained by conventional means resorting to a variable frequency oscillator the frequency of which is controlled by conventional means.

On the other hand, the receiving station which is to receive the waves from each of the cooperating transmitters includes, firstly, a very stable pulse generator which is advantageously identical with the generator at the transmitter stations and, secondly, a system of meters also identical with those of said transmitting stations. Such a sub-assembly produces consequently, during one cycle, square signals which in principle are identical with the square signals controlling the actual corresponding transmitting station.

Each of said sub-assemblies includes furthermore means for acting on the one hand on the timing of the meter that is on the position of its zero or in other words on the moment at which it begins counting the pulses and on the other hand on the frequency of repetition of its pulse generator, so as to produce a permanent and accurate synchronism between the fundamental frequency of the square signal produced and the corresponding received wave.

The synchronism thus obtained is devoid of any ambiguity inasmuch as it cannot be obtained unless the meters at the transmitting station and at the receiving sub-assemblies are in unison except for the duration of the travel of the waves; in other words, the passage from the first frequency stage of the square signal supplied by the sub-assembly considered to the second stage for instance is obtained accurately at the moment at which the value of the frequency of the corresponding received wave passes in its turn from the first to the second stage.

It will be remarked from this standpoint that the synchronization to be obtained when starting operation of the receiving sub-assembly considered includes two separate operations, one of which consists precisely in setting the meters in synchronism, which operation is of a digital character, while the other operation, which is of a continuous type, consists in bringing the frequency of the local generator at the receiver end to a value which is accurately equal to that of the generator at the corresponding transmitting station, taking into account of course the possible Doppler effect generated for instance by the movement of the receiving station. These operations will be disclosed with further detail hereinafter.

When it is desired to measure a difference between durations of travel, it is sufficient, according to our invention to resort, on the one hand, to two transmitters of which the operating cycles, which are both of a duration T, are exactly similar and perfectly synchronized, except for a phase shift of a known and accurately unvarying amount and, on the other hand to a receiving station carried by the movable part of which it is desired to ascertain the position and including two receiving sub-assemblies, which are synchronized in the manner referred to hereinabove with the corresponding transmitter. It is then sufficient to measure the difference in phase between the two receiving sub-assemblies, said difference supplying a measurement of the difference between the durations of travel of the waves passing out of the two transmitters considered.

Said measurement allows defining in a well-known manner the locus on which the movable part is to be found and the measurement of another difference between the durations of travel of the waves produced by two other transmitters, of which one may be simply one of the two first-mentioned transmitters, supplies a further locus whereby it is possible to ascertain the accurate location of the movable part at the crossing point between the two loci.

This shows inter alia that a receiving station capable of defining the location of the movable part requires at least three receiving sub-assemblies of the type referred to hereinabove.

On the other hand, under the sole condition of shifting with reference to time by predetermined unvarying suitably selected values, the starting points of the operative cycles of the different transmitters, which cycles are designed so as to be identical, it is possible to use the same range of frequencies for all the transmitters. As a matter of fact, by reason of the above-mentioned shifting with reference to time, the instantaneous frequency received at any moment by a receiver carried by the movable part and produced by one transmitter differs of necessity substantially from the frequencies received and produced by the other transmitters by amounts sufficient for the receiving station to separate readily the waves radiated by the different transmitters.

It is of interest to disclose to this end an embodiment of the numeric values defined, which show the magnitudes of the different parameters used.

In said example, the frequency $f$ of the wave transmitted varies between about 10 and 14 kilocycles during a cycle of a duration T lasting about 10 seconds, the variation in frequency being obtained in about 100 stages. The pulses supplied by the very stable generator controlling the production of said variable frequency show a frequency which does not vary with time and is equal to about 10 megacycles, said generator being stabilized by a crystal the stability of which is of a magnitude equal to $10^{-8}$.

We will now describe our invention with further detail, reference being made to the accompanying drawings illustrating by way of an exemplification and by no means in a limiting sense various preferred embodiments. In said drawings:

FIG. 1 is the diagram of a transmitting station.

FIG. 2 is the diagram of a receiving sub-assembly shown when operating normally.

FIG. 3 is a diagram illustrating the synchronization of a transmitter.

FIG. 4 is a diagram illustrating the synchronization of a movable receiving station.

FIG. 5 illustrates the synchronization of a receiving sub-assembly such as that shown in FIG. 2 including means for starting its operation.

FIGS. 6a–6c and 7a–7c are explanatory diagrams.

FIG. 1 illustrates diagrammatically a transmitting station including a very stable pulse generator 1 supplying across its output terminals pulses the constant frequency of repetition of which is controlled for instance by a crystal the drift of which remains lower than $10^{-8}$. Said frequency is for instance of a magnitude of 10 megacycles. The pulses fed by said generator 1 feed a meter 2 which produces at its output end a pulse each time it has counted a predetermined number N of pulses passing out of the generator 1. Said number N or operative value varies during the transmitting cycle and is defined as disclosed hereinafter as a function of the data supplied through the agency of the connection 3. The pulses supplied by said meter 2 reach in their turn the meter 4 which supplies at its output end a pulse each time it has counted a predetermined number N2 of pulses passing out of the counter 2, said number N2 being unvarying and of a magnitude equal for instance to 2,000. For this purpose, the meter 4 (along with the remaining meters referred to hereinafter) comprises a conventional, commercially available preset pulse counter. For a more detailed description of a suitable preset pulse counter for this purpose, reference is made to the textbook entitled "Computer Handbook" by Huskey and Korn, published by the McGraw-Hill Company, Inc.

The pulses supplied by the meter 4 feed in their turn the meter 5 which is returned to zero each time it has counted a predetermined number N3 of pulses passing out of the meter 4, said number N3 being also constant and of a magnitude of about 100.

The number $n$ of pulses totalized at any moment at the output of the meter 5 varies thus during the transmitting cycle having a period T between zero and the value N3.

Said number $n$ is transmitted by the connection 3, preferably in a digital form to the meter 2, in which said information is used for modifying the operative value N of the latter in conformity with the relationship $N=N1-n$.

N being an unvarying number of a magnitude equal for instance to 500.

Consequently, during each transmitting cycle, the number N assumes in succession N3 values N1, N1−1, N1−2, . . . the pulses supplied by the meter 2 being separated by time intervals proportional to said successive N3 values. Consequently, during the said transmitting cycle, the frequency of repetition of said pulses varies as a reverse of said values and is distributed over N3 stages, the duration of each stage being equal to the interval separating two successive pulses appearing at the output of the meter 4.

Furthermore an element 6 is fed with the pulses supplied by the meter 2 and produces at its output end a voltage the absolute value of which is substantially constant, while its polarity changes each time said element 6 receives a pulse and more accurately said polarity is positive or negative according as to whether the number of pulses received since starting the operation is odd or even. In other words, the element 6 transforms the pulses supplied by the meter 2 into a square signal of which the frequency $f$ is equal to one half that of said pulses and varies consequently correspondingly.

It is essential to remark that the meters 2, 4, 5, connection 3 and element 6 may be executed in various manners and it seems of interest to describe first a particularly simple embodiment. In said embodiment given by way of example, the values of the numbers N1, N2, N3 are integral powers of 2. For instance $N1=2^9=512$, $N2=2^{11}=2,048$, $N3=2^7=128$, so that if it is desired for instance for the frequency of the square signal supplied by the element 6 to vary during one cycle between the values $f1=10.2$ kilocycles and $f2=13.6$ kilocycles, it is necessary for the frequency of the generator 1 to be accurately equal to 10.4448 megacycles and consequently the duration T of the cycle will be substantially equal to 11.33 seconds.

Conversely, it should be remarked that the system 2–3, 4–5–6 may be replaced by more compound arrangements resorting to the technique of digital computers, which allows producing a square signal of which the frequency $f$ varies in accordance with the programme which is believed to be the best for radiolocating purposes.

Thus, for instance, certain particular frequencies such as the extreme frequencies may last over stages of a duration higher than that of the intermediate frequency stages.

The transmitting station illustrated diagrammatically in FIG. 1 includes furthermore elements 7 and 8 adapted to produce the waves to be transmitted. The element 7 receives the square signal supplied by the element 6 and bestows it with the power required for feeding the transmitting aerial 8 which by reason of the filtering it exerts necessarily, transforms each square signal into a sinusoidal wave. It should be remarked that the element 7 includes in particular the means required for adjusting the aerial circuit and its own circuits in accordance with the value of the frequency $f$ of the waves to be transmitted, which frequency varies within comparatively wide limits during the transmitting cycle. To this end, the element 7 is fed through the connection 9 with the value of the number $n$ supplied by the meter 5, which value defines, as mentioned hereinabove, the frequency $f$ of the square signal and consequently that of the wave to be transmitted.

Said element 7 is provided also with the means required for controlling the difference in phase between the wave thus transmitted and the fundamental wave forming part of the square signal supplied by 6. From this standpoint, it should be remarked that it is by no means essential for said difference in phase to be permanently equal to zero and it is sufficient, in contradistinction, for its average value to be zero during comparatively large time intervals of a magnitude of for instance $\frac{1}{10}$ of a second. On the other hand, it is important for said average value to be equal to zero with a high accuracy, for instance with an accuracy within 1°.

It should lastly be remarked that the actual transmission may be interrupted by idle periods and this is in fact essential each time the frequency $f$ of the square signal shows a substantial lack of continuity. It should however be remarked at this point that:

On the one hand, during said idle periods the elements 1 to 6 should always continue operating.

On the other hand, in such a case, the total phase of the transmitted wave is not lost; in other words, its value remains always equal to that which it would have assumed if the transmission had not been interrupted.

Slightly before the end of a cycle during which the frequency rises for instance from $f1=10.2$ kilocycles to $f2=13.6$ kilocycles, the transmission is interrupted during a very short time during which the tuning means return to the position occupied by them at the beginning of a cycle, this being controlled by the meters.

Since during said idle period the pulse generator has not ceased operating and controls the beginning of the next cycle, it is certain that each cycle begins at an accurate moment defined by the generator 1 and is identical with the preceding cycle and with the following cycle.

FIG. 2 illustrates diagrammatically a receiving subassembly adapted to receive the wave transmitted by a transmitter such as that illustrated in FIG. 1.

Of course, the actual receiving station should include a number of similar sub-assemblies so that it may be possible to receive the waves transmitted by several transmitters. Said receiving station includes furthermore means described hereinafter with reference to FIGS. 3 and 4 and adapted to utilize the information received by said subassemblies.

It should also be mentioned with a view to making the disclosure clearer that the sub-assembly illustrated in FIG. 2 includes only the elements required for its actual normal operation, while those required for starting its operation are described hereinafter with reference to FIG. 5.

The receiving sub-assembly illustrated in FIG. 2 includes elements 11 to 16 which are advantageously identical with the elements 1 to 6 of the transmitter illustrated in FIG. 1. The element 16 thus at its output end forms a square signal which is in principle identical with the square signal fed by the element 6 of said transmitter.

Furthermore, a meter 20 is fed directly with the pulses supplied by the generator 11 and is returned to zero at the end of each cycle the period of which is equal to T as provided for instance by the connection 23 feeding said meter with the value of the number $n$ supplied by the meter 15. Said meter 20 totalizes thus at any moment the number of pulses supplied by the generator 11 since the beginning of each operative cycle.

It is immediately apparent that said number of pulses is proportional to the time $h$ elapsed since the beginning of said operative cycle, so that consequently the measurement obtained is extremely accurate. Said information $h$ is transmitted through a connection 24, preferably in a digital form to the arrangements using the information.

Lastly, the receiving subassembly illustrated in FIG. 2 includes:

A receiving aerial 30 feeding an element 31 selecting and amplifying the signal produced by the transmitter the waves produced by which are to be used at the moment considered. The element 31 includes inter alia the means required for adjusting a filter so as to make the latter match permanently the value, which varies with time, of the frequency of the received wave. To this end, said element 31 receives through the connection 33 the value of the number $n$ supplied by the meter 15, which value $n$ defines, as already mentioned, the value of the frequency to be received.

A phase detector 32 which receives on the one hand the output signal supplied by the element 31 and on the other hand, the square signal supplied by the element 16 so that said phase detector may measure the difference in phase between said signals that is precisely the phase difference between the output signal of the part 31 and the fundamental component included in the square signal supplied by the element 16. The measurement thus provided advantageously by the phase detector 32 forms a voltage which is caused to react through the connection 34 on the frequency of the generator 11 so as to cut out, through such feedback, the phase difference considered.

Of course, said feedback loop should be cut off during the idle periods of the transmission by mean which are not illustrated and the operation of which is controlled for instance by the information $n$ supplied by the meter 15.

It should also be remarked that it is by no means necessary for the difference in phase considered to be permanently equal to zero and that it is sufficient, in contradistinction, for the average value over comparatively large time intervals to be equal to zero with a high accuracy. The duration of said time intervals is all the larger when the crystal stabilizing the generator 11 is more stable.

In brief, it is apparent that during normal operation the receiving subassembly illustrated in FIG. 2 supplies at its output end 24 a measurement $h$ forming an extremely accurate digital information of a magnitude $H-\Delta$ wherein H designates the time elapsed since the beginning of the operative cycle of the transmitter the waves of which are being received, while $\Delta$ designates the duration of travel of the radio-electric waves between the said transmitter and the receiving station.

Consequently, two receiving subassemblies supply corresponding measurements $h1$ and $h2$ and the difference between said two measurements after subtraction of a constant difference in time K between the moments at which the cycles of the two transmitters considered begin, supplies, as immediately apparent, a measurement of the difference between the durations of travel of the waves.

In order to obtain such a result, it is essential for said time shifting K to be perfectly constant, which leads to the necessity of a synchronization of the two transmitters with reference to each other.

FIG. 3 illustrates diagrammatically such a synchronization.

Said figure shows two transmitting stations 41 and 42 and an auxiliary correcting receiving station at a known unvarying location adapted to act on the transmitter 42 for instance, so as to synchronize it with the other transmitter 41 that is to act on said transmitter in a manner such as to make the transmitting cycles of the two transmitters considered assume accurately the same duration T and remain synchronous, except for a known and perfectly unvarying time shift.

Said unvarying time shift allows as a matter of fact resorting for each of the two transmitters considered to the same range of frequencies and to the same law governing the modifications of said frequencies, while at any moment the waves transmitted by the two transmitters and received by the receiver show a sufficient difference in frequency for their selection to become possible.

To this end, said time shift should be advantageously equal to a fraction of the duration T of the cycle; if for instance T is equal to 10 seconds and if the arrangement includes ten transmitters, the different time shifts may be equal to an integral number of seconds.

The auxiliary receiving station illustrated in FIG. 3 includes:

A receiving aerial 40 feeding two subassemblies 44 and 45, both similar to that illustrated in FIG. 2 and adapted to receive the waves radiated respectively by the transmitters 41 and 42. Each of said subassemblies selects the signal produced by the transmitter corresponding thereto and selects the corresponding information $h$, to wit $h1$ for the subassembly 44 and $h2$ for the subassembly 45.

A differential element 46, executed advantageously in accordance with the technique of digital computers which receives the two information signals $h1$ and $h2$ and compares their difference with a predetermined constant value $k$ defining the arrangement. The value of the difference $k-(h1-h2)$ thus obtained is transmitted by the connection 47 of any known type whatever so as to act on the frequency of the generator 1 of the transmitter 42, the feedback thus obtained having for its result a cutting out of the said difference $k-(h1-h2)$.

In this case again, it should be remarked that it is by no means necessary for last-mentioned difference to be permanently equal to zero and on the contrary it is sufficient for its average value during advantageously very long time intervals to be very accurately reduced to zero and it is therefore of advantage to stabilize the generators 1 of the different transmitters by means of crystals of a very high stability.

Finally, these arrangements have for their result to make the difference $(h1-h2)-k=0$.

More accurately, resorting again to the parameters H and $\Delta$ referred to and when examining FIG. 2 H1 and $\Delta$1 are the values of said parameters for the transmitter 41 and H2 and $\Delta$2 for the transmitter 42 and considering that $h1$ and $h2$ are respectively equal to the differences $H1-\Delta$, and to $H2-\Delta2$ the above-described means have for their result to subject H1 and H2 to satisfy the relationship $H1-H2=k+(\Delta1-\Delta2)$.

Since the transmitters and auxiliary receiver are stationary, the magnitudes $\Delta1$ and $\Delta2$ are constant and consequently the above relationship may be written as follows:

$$H1-H2=K$$

K being a constant equal to $-k(\Delta1-\Delta2)$.

It is obviously sufficient to give $k$ a suitable value for K to assume the desired value, say an integral number of seconds.

FIG. 4 illustrates diagrammatically the operation of a movable receiving station. Said figure shows three transmitting stations 51, 52, 53 which are all similar to the transmitting station illustrated in FIG. 1 and which are synchronized with one another in the manner disclosed during the description of FIG. 3 and furthermore a receiving station adapted to receive the waves transmitted by said three transmitting stations and located on board a vehicle or the like movable part of which it is desired to define the position.

Said receiving station includes:

A receiving aerial 50 feeding the sub-assemblies 54, 55, 66 which are all similar to that illustrated in FIG. 2 and adapted to receive the waves produced by the corresponding transmitters 51, 52, 53 respectively.

Each of said sub-assemblies selects the signal produced by the transmitter with which it is associated and produces the corresponding information $h$ to wit: $h3$ for the sub-assembly 54, $h4$ for the sub-assembly 55 and $h5$ for the sub-assembly 56.

It should be remarked that the crystals stabilizing the generators 11 of the sub-assemblies 54, 55, 56 are advantageously selected so as to be very stable, while account is taken of the necessity for the frequencies of said crystals to be modified to a sufficient extent with a view to compensating the Doppler effect arising chiefly by reason of the movement of the vehicle carrying the receiving station.

Two differential elements 57 and 58 executed advantageously in accordance with the technique of digital computers, the differential element 57 receiving the two information signals $h3$ and $h4$ so as to produce the difference $h3-h4$ while similarly the element 58 receiving the two information signals $h4$ and $h5$ produces the difference $h4-h5$.

By reason of the synchronisation of the transmitters, the results obtained allow defining the differences in the duration of travel $\Delta3-\Delta4$ and $\Delta4-\Delta5$ without any possible ambiguity.

These results allow consequently defining two hyperbolas of which the intersection gives out the location of the vehicle carrying the receiving station.

We will now show how it is possible, when starting operation of the receiving station, to synchronize such sub-assemblies with the waves produced by the corresponding transmitters without any ambiguity being possible. To this end, FIG. 5 illustrates diagrammatically a receiving sub-assembly similar with that illustrated in FIG. 2, in association with the means starting its operation.

Said figure includes the elements 11 to 16 and 30 to 34 already described with reference to FIG. 2.

Furthermore, an element 60 executed in accordance with the technique of digital computers and forming a programme-defining element is adapted to control, through the agency of connection which are not illustrated for sake of clarity of the drawings, the sequence of the different operations provided for the starting of the arrangement. Said programme-defining element receives to this end various information signals and in particular the instantaneous value of the frequency $f$ of the square signal provided by the element 16, which value is supplied by the element 15 as constituted by the number $n$.

Said figure shows also the elements 61 to 65 the nature and operation of which are disclosed hereinafter:

61 is constituted by a three-way switch; for its first position, the connection 34 is cut off completely, for its second position the connection 34 is connected with the auxiliary generator 64 described hereinafter and for its third position, said connection 34 is connected with the generator 11.

Similarly, the element 62 is also a three-way switch; for its first position, it cuts off the meter 12 both from the said generator 64 and from the generator 11, while for its second position the meter 12 is connected with said auxiliary generator 64 and for its third position, it is connected with the generator 11.

The element 63 is a threshold detector receiving the output voltage fed by the selecting and amplifying element 31 and transmitting a corresponding voltage to the programme-defining element 60 whenever the output voltage of 31 rises above a predetermined threshold.

The element 64 is an auxiliary pulse generator adapted to feed during the starting period the meter 12.

The element 65 is a differential meter receiving the pulses from the generators 11 and 64 and feeding the value of their difference to the programme-defining element 60 adapted to control the switches 61 and 62.

At the beginning of the starting period, the switch 61 is open and cuts off the connection 34, while the switch 62 connects the meter 12 with the pulse generator 11. As soon as the frequency $f$ assumes a predetermined value $f0$ which may for instance approximate the value $f1$ defining the beginning of each cycle, the programme-defining element 60 opens the switch 62 so that the meters 12, 14 and 15 receive no longer any pulse and remain in predetermined positions. Consequently, the element 31 is tuned to the frequency $f0$ and supplies therefore at its output end a signal of a substantial amplitude only when the frequency of the received wave passes through said value $f0$. The threshold detector 63 supplies then said information to the programming defining element 60 which acts immediately on the switches 61 and 62 in a manner such that the meter 12 receives then the pulses supplied by the auxiliary pulse generator 64 which is independent of the generator 11, while the feedback voltage supplied by the phase detector 32 acts through the connection 34 on the frequency of said auxiliary generator 64 with a gain sufficient for a modification of its frequency by about 1% for instance.

It is apparent that such contrivances result, on the one hand, in a synchronisation of the signal thus supplied by the element 16 with the signal produced by the received waves and, on the other hand, in a correspondence between the value $n$ supplied by the element 16 and the instantaneous value of the frequency of the received wave, both results being ensured with an approximation of a magnitude for instance of $\frac{1}{100}$ of the period T, say for instance $\frac{1}{10}$ of a second.

As soon as the frequency $f$ the value of which is transmitted to the programme-defining element 60 by the element 16 assumes a predetermined value $f3$ which is slightly different from $f0$, so as to allow the auxiliary generator 64 to be stabilized in the meantime, the programme-defining element 60 releases the differential meter 65 which had been precedingly returned to zero and which begins now counting, in magnitude and with the proper sign, the difference $\delta$ between the number of pulses supplied by the generators 11 and 64 respectively. Said information is permanently supplied to the programme-defining element 60.

As soon as $f$ assumes a predetermined value $f4$ which may for instance be near the value $f2$ defining the end of the cycle, the programme-defining element 60 stores the value $\delta1$ reached at said accurate moment by the difference $\delta$; furthermore, it opens the switch 61 so as to make the generator 64 independent of the feedback produced by the phase detector 32 and conversely it constrains said auxiliary generator 64 to assume a frequency which is clearly different from that of the generator 11 and is higher or lower than said generator frequency by 1% for instance; according as to whether δ1 is positive or negative. When δ reaches a value of δ2 defined by the relationship $$\delta 2 = \delta 1 \frac{f4}{f4-f3}$$

and may thus be readily reckoned by the programme-defining element 60, since the values f3 and f4 are constants defined by the structure of the arrangement, said element 60 sets the switches 61 and 62 in their position corresponding to normal operation as described with reference to FIG. 2. In other words, the meter 12 receives the pulses supplied by the pulse generator 11 while the reaction supplied by the phase detector 32 acts on said generator 11.

It is apparent that such arrangements have for their results:

On the one hand a synchronization between the signal supplied by the element 16 and the signal produced by the received wave.

On the other hand, a correspondence between the information n supplied by the element 15 and the frequency of the received wave, but in the present case with an approximation of a magnitude of 1 microsecond, in all cases clearly less than the period of the waves transmitted and consequently without any possible ambiguity.

It should now be remarked that as soon as δ reaches the value δ2 so as to start normal operation, the synchronization is obtained without any ambiguity even if the generator 11 shows a slight drift in frequency. It is apparent in fact that a drift by $10^{-7}$ leads at the moment of the passage to normal operation to an error which is at the utmost equal to a few microseconds. It is therefore obvious that the feedback supplied by the phase detector S2 and fed into the generator 11 may then act efficiently and reduce said error to the minimum allowed by the quality of the radio-electric transmission system.

It is practically possible to understand in a more concrete manner the possibility of obtaining a synchronization devoid of any ambiguity by considering the optic control means described briefly hereinafter with reference to FIGS. 6 and 7.

It has been shown, when describing FIG. 2, that the phase detector 32 measures the phase difference appearing between the signals supplied respectively by the elements 16 and 31. Obviously, said phase detector 32 may, without disturbing by any means the normal operation described with reference to FIG. 2, be made more complete so as to supply two voltages equal respectively in magnitude and in sign to $A \cos \varphi$ and $A \sin \varphi$, wherein A designates the amplitude of the signal supplied by the element 31, while $\varphi$ designates the phase difference measured by the phase detector 32.

FIGS. 6 and 7 provide a few examples of the images obtained by making said two voltages control an oscilloscope in a horizontal and in a vertical direction respectively.

FIG. 6 corresponds to the case where the waves received are devoid of any anomaly in their propagation, while FIG. 7 corresponds to the case where the received waves are constituted by the combination of a direct wave and of an antipodal wave, assuming the receiving station is within about 100 km.

station is within about 100 km. from the antipode and the amplitude of the antipodal wave is equal to ⅔ of that of the direct wave.

More definitely, FIGS. 6a and 7a correspond to the case of a correct synchronization, while FIGS. 6b and 7b and also 6c and 7c correspond to cases where said synchronization is performed with an error equal to a period of the received wave, said error being positive for 6b and 7b and negative for 6c and 7c.

Said figures show that even when the propagation is subjected to substantial anomalies, an error in synchronization by ±1 period cannot escape the observer.

What we claim is:

1. An arrangement for the radio-location of a movable part carrying at least two radio-receiving sub-assemblies with reference to at least two mutually spaced transmitting stations comprising at each transmitting station means for producing radio frequency waves to be transmitted to the corresponding receiving sub-assembly at frequencies varying stepwise in a continuous phase coherent manner throughout a number of successive frequency stages according to a predetermined law during each one of a number of successive transmission cycles of operation and means coupled to the outputs from the receiving sub-assemblies for comparing continuously the phases of the waves received by each receiving sub-assembly during each transmission cycle of operation and deriving a measure of any difference.

2. An arrangement as claimed in claim 1, wherein said radio frequency wave producing means include a very stable pulse generator, a first meter comprised by a preset pulse counter controlled by said generator and producing a signal each time the generator has fed it with a succession of N pulses, a second metering system including a second preset pulse counter controlled by the signals produced by the first meter and adapted to produce a signal each time it has received a predetermined unvarying number of signals from the first meter, each signal of the second metering system reducing by a predetermined amount of the number N of pulses feeding the first meter, means fed by the signals from the first meter and adapted to produce a square wave signal at a frequency f, and an aerial fed by last-mentioned means and radiating waves at a corresponding frequency.

3. An arrangement as claimed in claim 1, wherein said radio frequency wave producing means include a very stable pulse generator, a first meter comprised by a first preset pulse counter controlled by said generator and producing a signal each time the generator has fed it with a succession of N pulses, a second metering system including a second preset pulse counter controlled by the signals produced by the first meter and adapted to produce a signal each time it has received a predetermined unvarying number of signals from the first meter, each signal of the second metering system reducing by a predetermined amount the number N of pulses feeding the first meter, means fed by the signals from the first meter and adapted to produce a radio frequency wave at a frequency f and an aerial fed by last-mentioned means and radiating waves at a corresponding frequency, and wherein each receiving sub-assembly includes a pulse generator, a first receiving meter comprised by a first receiving preset pulse counter and a second receiving metering system comprised by a second receiving preset pulse counter substantially identical with those of the corresponding transmitting station, an aerial adapted to receive the waves transmitted by said corresponding transmitting station, means fed by the signals from the first meter and adapted to produce a radio frequency square wave signal identical except for phase with that produced at the corresponding transmitting station and wherein the phase-comparing means include a phase detector for comparing the phase of the incoming waves fed by last-mentioned aerial and the fundamental component of the square wave signal produced by last-mentioned means, a feedback circuit element connecting the output of said phase detector with the pulse generator of the receiving sub-assembly considered and output means fed by the last-mentioned generator during each successive transmission cycle of the sub-assembly to measure the time elapsed since the beginning of the latter and which differs from the corresponding time at the corresponding transmitting station by the time required for the travel of the waves between the latter and the movable part.

4. An arrangement as claimed in claim 1 comprising furthermore an auxiliary receiver adapted to compare the phases of the transmitting stations and means whereby said auxiliary receiver controls one of the transmitting stations to ensure synchronism with the other station.

5. An arrangement as claimed in claim 1, wherein said radio frequency wave producing means include a very stable pulse generator, a first meter comprised by a first preset pulse counter controlled by said generator and producing a signal each time the generator has fed it with a succession of N pulses, a second metering system including a second preset pulse counter controlled by the signals produced by the first meter and adapted to produce a signal each time it has received a predetermined unvarying number of signals from the first meter, each signal of the second receiving metering system reducing by a predetermined amount the number N of pulses feeding the first receiving meter, means fed by the signals from the first meter and adapted to produce a square wave signal at a frequency $f$ and an aerial fed by last-mentioned means and radiating waves at a corresponding frequency, and wherein each receiving sub-assembly includes a pulse generator, a first receiving meter comprised by a first receiving preset pulse counter and a second receiving metering system substantially identical with those of the corresponding transmitting station, an aerial adapted to receive the waves transmitted by said corresponding transmitting station, means fed by the signals from the first receiving meter and adapted to produce a frequency signal identical except for phase with that produced at the corresponding transmitting station, and wherein said phase comparing means include a phase detector for comparing the phases of the incoming waves fed by the last-mentioned aerial and of the fundamental component of the square wave signal produced by last-mentioned means, said arrangement including furthermore a feedback circuit element connecting said phase detector with the pulse generator of the receiving sub-assembly considered, output means fed by last-mentioned generator during each successive transmission cycle of operation of the sub-assembly to measure the time elapsed since the beginning of the cycle and which differs from the corresponding time at the corresponding transmitting station by the time required for the travel of the waves between the latter and the movable part, and means for starting operation of each sub-assembly including a programme-defining element, a threshold detector through which the waves from the corresponding transmitting station are fed to said programme-defining element, an auxiliary pulse generator and switches controlled by said element when energized to insert selectively the first-mentioned pulse generator and the auxiliary pulse generator between the first receiving meter and the phase detector.

6. A method of radio location according to claim 1 wherein the frequency $f$ of the waves transmitted by each transmitting station is varied between closely spaced frequency stages in a continuous phase coherent stepwise manner such that the total phase $\theta$ during each transmission cycle of operation is given at any instant $t$ by the expression:

$$\theta = 2\pi \int_0^t f\, dt + y$$

where $y$ is the initial phase and $\theta$ increases continuously in a stepwise phase coherent manner without any phase jumps occurring upon the frequency of the transmitted signal being varied stepwise between stages throughout each transmission cycle of operation.

7. A method for the radio location of a movable part carrying at least two radio-receiving sub-assemblies, with reference to at least two mutually spaced transmitting stations comprising varying the frequency of the waves produced by each transmitting station and received by the corresponding receiving sub-assembly according to a predetermined law throughout a number of successive closely spaced frequency stages occurring in the course of one continuous transmission cycle of operation, and repeating the transmission cycles of operation at a known rate, the frequency $f$ of the waves transmitted by each transmitting station being varied continuously stepwise in a continuous phase coherent manner from one frequency stage to the next throughout a predetermined range during each transmission cycle of operation.

8. A method of radio location according to claim 7 wherein the frequency $f$ of the waves transmitted by each transmitting station is varied between the closely spaced frequency stages in a continuous phase coherent stepwise manner such that the total phase $\theta$ during each transmission cycle of operation is given at any instant $t$ by the expression:

$$\theta = 2\pi \int_0^t f\, dt + y$$

where $y$ is the initial phase and $\theta$ increases continuously in a phase coherent stepwise manner without any phase jumps occurring upon the frequency of transmitted signal being varied stepwise between stages throughout each transmission cycle of operation.

9. A method of radio location according to claim 7 wherein the frequency $f$ of the waves transmitted by each transmitting station is caused to vary stepwise in a continuous phase coherent manner between the successive closely spaced frequency stages by equal very small amounts in an unvarying direction and is maintained constant throughout each frequency stage with the totality of frequency stages extending over a predetermined range of frequencies during each transmission cycle of operation.

References Cited

UNITED STATES PATENTS

| | | | |
|---|---|---|---|
| 2,690,558 | 9/1954 | Harvey | 343—104 |
| 2,718,002 | 9/1955 | Clavier | 343—105 |
| 2,754,512 | 7/1956 | Davis et al. | 343—104 |
| 3,130,407 | 4/1964 | Kramer | 343—105 X |
| 3,136,995 | 6/1964 | Jolliffe et al. | 343—105 |
| 3,202,993 | 8/1965 | O'Brien | 343—105 |

RODNEY D. BENNETT, *Primary Examiner.*

MALCOLM F. HUBLER, *Assistant Examiner.*